United States Patent
Yamamuro

(10) Patent No.: US 10,686,953 B2
(45) Date of Patent: Jun. 16, 2020

(54) INPUT ASSISTING METHOD, NON-TRANSITORY COMPUTER-READABLE RECORDING MEDIUM AND SETUP-INFORMATION INPUT SYSTEM IMPROVES ACCURACY OF SETTINGS VALUE TO BE INPUTTED IN SETTING FIELDS USING A RULE BY USING MACHINE LEARNING

(71) Applicant: KONICA MINOLTA, INC., Chiyoda-ku, Tokyo (JP)

(72) Inventor: Tatsuro Yamamuro, Kashiwa (JP)

(73) Assignee: KONICA MINOLTA, INC., Tokyo (JP)

(*) Notice: Subject to any disclaimer, the term of this patent is extended or adjusted under 35 U.S.C. 154(b) by 0 days.

(21) Appl. No.: 16/271,591

(22) Filed: Feb. 8, 2019

(65) Prior Publication Data
US 2019/0253574 A1    Aug. 15, 2019

(30) Foreign Application Priority Data

Feb. 14, 2018 (JP) .................................. 2018-023747

(51) Int. Cl.
*H04N 1/00* (2006.01)
*G03G 15/00* (2006.01)
*G06F 3/0482* (2013.01)

(52) U.S. Cl.
CPC ..... *H04N 1/00482* (2013.01); *H04N 1/00204* (2013.01); *H04N 1/00352* (2013.01); *G03G 15/6538* (2013.01); *G06F 3/0482* (2013.01)

(58) Field of Classification Search
None
See application file for complete search history.

(56) References Cited

U.S. PATENT DOCUMENTS

2014/0055799 A1* 2/2014 Nakagawa ......... G06K 15/1803
                                                             358/1.13
2018/0189004 A1* 7/2018 Yokoohji .............. G06F 3/1206

FOREIGN PATENT DOCUMENTS

JP          2015176293 A     10/2015

* cited by examiner

*Primary Examiner* — Benny Q Tieu
*Assistant Examiner* — Haris Sabah
(74) *Attorney, Agent, or Firm* — Holtz, Holtz & Volek PC

(57) ABSTRACT

Provided are an input assisting method, a non-transitory computer-readable recording medium and a setup-information input system including an information input apparatus. A hardware processor of the apparatus determines at least one candidate value for at least one input field in a setup screen, by using a first data set created from a database of setting values specified for past jobs, creates a rule for the at least one candidate value, and calculates an evaluation value. On finding no candidate value for which a sufficient evaluation value was calculated, the hardware processor creates a second data set from the first data set, creates a rule for at least one candidate value determined for the at least one input field, by using the second data set, and when detecting an operator's operation on a certain input field, indicates a candidate value determined according to the rule, in the certain input field.

24 Claims, 10 Drawing Sheets

FIG. 5

| DATE | LHS | | | RHS | | | |
|---|---|---|---|---|---|---|---|
| | CUSTOMER NAME | PRODUCT NAME | CATEGORY | PAPER TYPE | PAPER SIZE | COPIES | |
| 2016/7/1 15:37 | Football Company | Football Monthly | Magazine | Fine_N | 182 x 257mm | 100000 | |
| 2016/8/1 15:37 | Football Company | Football Monthly | Magazine | Fine_N | 182 x 257mm | 100000 | |
| 2016/9/1 15:37 | Football Company | Football Monthly | Magazine | Fine_N | 182 x 257mm | 100000 | |
| 2016/10/1 15:37 | Football Company | Football Monthly | Magazine | Fine_N | 182 x 257mm | 100000 | |
| 2016/11/1 15:37 | Football Company | Football Monthly | Magazine | Fine_N | 182 x 257mm | 100000 | |
| 2016/12/1 15:37 | Football Company | Football Monthly | Magazine | Fine_N | 182 x 257mm | 100000 | |
| 2017/1/1 15:37 | Football Company | Football Monthly | Magazine | Coat_N | 220 x 282mm | 50000 | } PERIOD B |
| 2017/2/1 15:37 | Football Company | Football Monthly | Magazine | Coat_N | 220 x 282mm | 50000 | |
| 2017/3/1 15:37 | Football Company | Football Monthly | Magazine | Coat_N | 220 x 282mm | 50000 | |
| 2017/4/1 15:37 | Football Company | Football Monthly | Magazine | Coat_N | 220 x 282mm | 100000 | } PERIOD A |
| 2017/5/1 15:37 | Football Company | Football Monthly | Magazine | Coat_N | 220 x 282mm | 100000 | |
| 2017/6/1 15:37 | Football company | Football Monthly | Magazine | Coat_N | 220 x 282mm | 100000 | |
| 2017/7/1 15:37 | Football company | Football Monthly | Magazine | Coat_N | 220 x 282mm | 100000 | |

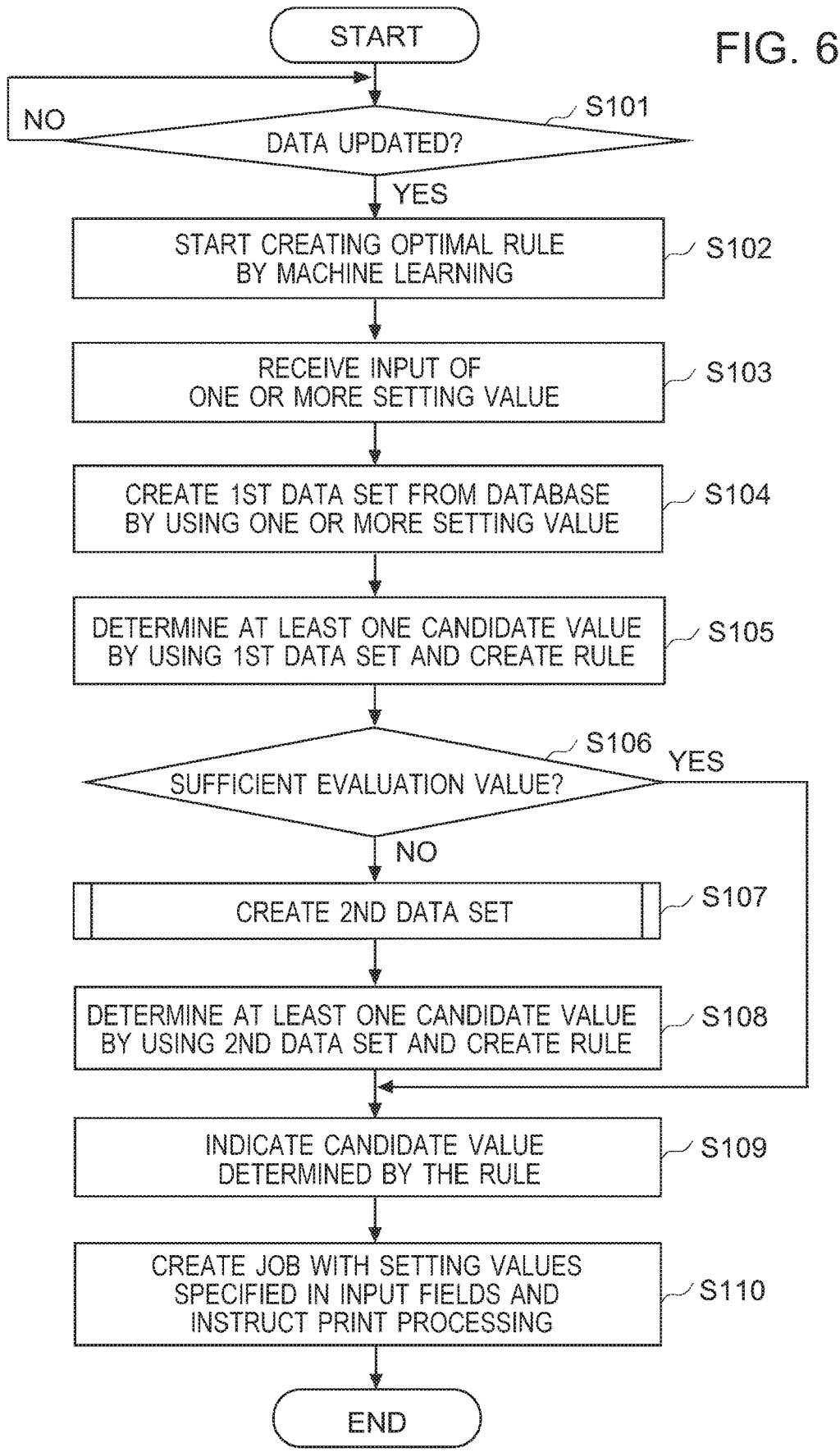

| Field | Value |
|---|---|
| PRODUCT NAME: | FOOTBALL MONTHLY |
| PRODUCT CATEGORY: | Magazine |
| CUSTOMER NAME: | Football Company |
| CUSTOMER CODE: | |
| SALES STAFF NAME: | |
| SALES STAFF CODE: | |
| CONTACT ADDRESS: | |
| OUTPUT TO: | ◉MIS  ○AccurioPro |
| PRODUCT SIZE: | B5 ▸  182 × 257 |
| TOTAL PAGES: | 182 |
| COPIES: | 10000 |
| BINDING STYLE: | Perfect Binding ▸ |
| BINDING POSITION: | ◉LEFT ○RIGHT ○NONE |
| JOB NAME: | |
| PAPER TYPE: | Fine_N ▸ |
| PAPER SIZE: | B5 ▸  182 × 257 |
| PRINT METHOD: | Offset ▸ |
| PRINTED SHEETS: | 10000 ▸ |
| COLORS: | 4+4 ▸ |
| PRINT ORDER: | KCMYKCMY ▸ |
| DATE TO PRINT: | |
| DELIVERLY DATE: | |
| PRODUCT STYLE: | Boxed |
| DELIVERLY DESTINATION: | |
| COLOR CALIBRATION: | DEP |
| SHEETS FOR CALIBRATION: | 6 |
| COLOR CONFIGURATION: | JapanColor Density |

[CONFIGURATION]

[OK]  [CANCEL]

INPUT ASSISTING METHOD, NON-TRANSITORY COMPUTER-READABLE RECORDING MEDIUM AND SETUP-INFORMATION INPUT SYSTEM IMPROVES ACCURACY OF SETTINGS VALUE TO BE INPUTTED IN SETTING FIELDS USING A RULE BY USING MACHINE LEARNING

Japanese Patent Application No. 2018-023747 filed on Feb. 14, 2018, including description, claims, drawings, and abstract, the entire disclosure of which is incorporated herein by reference in its entirety.

TECHNOLOGICAL FIELD

The present invention is directed to input assisting methods, non-transitory computer-readable recording media each storing an input assistance program and setup-information input systems. In particular, the present invention is directed to input assisting methods, non-transitory computer-readable recording media each storing an input assistance program and setup-information input systems, which can assist operator's operations to input setup information into input fields in a setup screen.

BACKGROUND

In recent years, there is a rapid turnover of workers for printing companies, and erroneous printing often arises from erroneous handling of information about an order received, performed by a person inexperienced in printing. In view of that, there have been developed systems for assisting operator's input of print setup information, configured to, in response to operator's operations to input order information into a corresponding input field in a setup screen, use machine learning to determine a candidate for a value to be specified in another input field together with the information and indicate the candidate in the input field in the setup screen.

For example, Japanese Unexamined Patent Publication (JP-A) No. 2015-176293 discloses the following information processing apparatus. The information processing apparatus includes: a display configured to display print settings recommended on the basis of print data; and one or more processors. The one or more processors are configured to, in response to receiving a change of a value for a first print setup option among the print settings on the display, use a history data of print settings used for past print processing, to determine a second print setup option to be changed together with the change of the first print setup option. The display is further configured to display a recommendation to change a value for the determined second print setup option.

However, the disclosed technique is not suitable for certain kinds of print products, such as periodicals, that can change in paper size or paper type on and after a certain month or can change in design according to the season. When obtaining a candidate for a setting value for such kind of print product by just using accumulated history data of print settings, an index used for a judgment whether to indicate the candidate (for example, one of support, confidence and lift being evaluation values used in association analysis, which indicate association between data pieces) becomes low. It may cause a problem that the apparatus does not indicate a candidate that is actually suitable for such kinds of print products.

For example, the above described JP-A No. 2015-176293 discloses the technique to, in response to a change of a value for a certain setup option among recommended print settings displayed on a display of an information processing apparatus, determine a value for another setup option to be changed together with the changed setup option, on the basis of the history data of print settings, and indicate the determined value as a recommended print setting. In this technique, a candidate value for the setup option to be changed together with the changed setup option, is obtained just by using the frequency of the use of the setting in the history data. When configuring print settings for certain kinds of print product that can change in paper size or paper type on and after a certain month or can change in design according to the season, like magazines or periodicals, the technique may cause a problem that an inappropriate candidate value is sometimes given because of the change.

SUMMARY

The present invention is directed to input assisting methods, non-transitory computer-readable recording media each storing an input assistance program and setup-information input systems, which can improve the accuracy of a candidate for a setting value to be indicated in an input field in a setup screen.

A method reflecting one aspect of the present invention is an input assisting method for use in a system including a storage device and an information input apparatus. The information input apparatus includes an input device, a hardware processor which is communicatively connected to the storage device, and a display that displays a setup screen indicating a candidate value in a corresponding input field in response to receiving an operator's operation on the setup screen through the input device, where the candidate value is determined by using a rule created by using machine learning, on the basis of one or more setting values each specified in another input field in the setup screen by the operator through the input device. The method comprises: accumulating sets of setting values that had been specified for jobs used for print processing, associated with time and date information, in a database stored in the storage device; and performing a rule creation by the hardware processor. The performing a rule creation includes: receiving an operator's operation through the input device to specify one or more setting values for respective one or more input fields in a setup screen displayed on the display; creating a first data set by extracting from the database sets of setting values, each including the one or more setting values specified by the operator determining, by using the first data set, at least one candidate value to be indicated in at least one of the other input fields in the setup screen, respectively; and creating a rule that associates the one or more setting values specified by the operator with the at least one candidate value. The method further comprises: calculating, by the hardware processor, an evaluation value indicating a degree of association between the one or more setting values specified by the operator with the at least one candidate value, to judge whether the evaluation value is not less than a predetermined criterion. The method further comprises, on finding no candidate value for which the evaluation value being not less than the predetermined criterion was calculated, performing a rule re-creation by the hardware processor. The performing a rule re-creation includes: creating a second data set by trimming the first data set by using a data-trimming rule in terms of time; determining, by using the second data set, at least one second candidate value to be indicated in the at least one of the other input fields, respectively; and creating a rule that associates the one or more setting values specified by the operator with the at least one second candidate value. The method further comprises, in response to detecting an operator's input operation on a certain input field among the at least one of the other input fields in the setup screen, causing, by the hardware processor, the display to indicate a candidate value determined according to the rule, in the certain input field.

A non-transitory computer-readable recording medium reflecting one aspect of the present invention stores an input assistance program for use in a system including a storage device and an information input apparatus. The storage device stores a database including sets of setting values that had been specified for jobs used for print processing, associated with time and date information. The information input apparatus includes an input device, a hardware processor which is communicatively connected to the storage device, and a display that displays a setup screen indicating a candidate value in a corresponding input field in response to receiving an operator's operation on the setup screen through the input device, where the candidate value is determined by using a rule created by using machine learning, on the basis of one or more setting values each specified in another input field in the setup screen by the operator through the input device. The program comprises instructions which, when executed by the hardware processor of the information input apparatus, cause the hardware processor to perform the following operations. The operations comprise performing a rule creation including: receiving an operator's operation through the input device to specify one or more setting values for respective one or more input fields in a setup screen displayed on the display; creating a first data set by extracting from the database sets of setting values, each including the one or more setting values specified by the operator; determining, by using the first data set, at least one candidate value to be indicated in at least one of the other input fields in the setup screen, respectively; and creating a rule that associates the one or more setting values specified by the operator with the at least one candidate value. The operations further comprise: calculating an evaluation value indicating a degree of association between the one or more setting values specified by the operator with the at least one candidate value, to judge whether the evaluation value is not less than a predetermined criterion. The operations further comprise, on finding no candidate value for which the evaluation value being not less than the predetermined criterion was calculated, performing a rule re-creation. The performing a rule re-creation includes: creating a second data set by trimming the first data set by using a data-trimming rule in terms of time; determining, by using the second data set, at least one second candidate value to be indicated in the at least one of the other input fields, respectively; and creating a rule that associates the one or more setting values specified by the operator with the at least one second candidate value. The operations further comprise, in response to detecting an operator's input operation on a certain input field among the at least one of the other input fields in the setup screen, causing the display to indicate a candidate value determined according to the rule, in the certain input field.

A setup-information input system reflecting one aspect of the present invention is a setup-information input system comprising: a storage device storing a database including sets of setting values that had been specified for jobs used for print processing, associated with time and date information; and an information input apparatus. The information input apparatus includes an input device, a hardware processor which is communicatively connected to the storage device, and a display that displays a setup screen indicating a candidate value in a corresponding input field in response to receiving an operator's operation on the setup screen through the input device, where the candidate value is determined by using a rule created by using machine learning, on the basis of one or more setting values each specified in another input field in the setup screen by the operator through the input device. The hardware processor performs a rule creation including: receiving an operator's operation through the input device to specify one or more setting values for respective one or more input fields in a setup screen displayed on the display; creating a first data set by extracting from the database sets of setting values, each including the one or more setting values specified by the operator, determining, by using the first data set, at least one candidate value to be indicated in at least one of the other input fields in the setup screen, respectively; and creating a rule that associates the one or more setting values specified by the operator with the at least one candidate value. The hardware processor calculates an evaluation value indicating a degree of association between the one or more setting values specified by the operator with the at least one candidate value, to judge whether the evaluation value is not less than a predetermined criterion. On finding no candidate value for which the evaluation value being not less than the predetermined criterion was calculated, the hardware processor performs a rule re-creation including: creating a second data set by trimming the first data set by using a data-trimming rule in terms of time; determining, by using the second data set, at least one second candidate value to be indicated in the at least one of the other input fields, respectively; and creating a rule that associates the one or more setting values specified by the operator with the each of the at least one second candidate value. In response to detecting an operator's input operation on a certain input field among the at least one of the other input fields in the setup screen, the hardware processor causes the display to indicate a candidate value determined according to the rule, in the certain input field.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, wherein:

FIG. 5 is a diagram illustrating an example of print settings (a first data set) according to one embodiment of the present invention;

FIG. 6 is a flowchart illustrating an example of operations (input assistance operations) of the information input apparatus according to one embodiment of the present invention;

FIG. 8 is a diagram illustrating an example of a print setup screen displayed by the information input apparatus according to one embodiment of the present invention;

DETAILED DESCRIPTION OF EMBODIMENTS

Hereinafter, one or more embodiments of the present invention will be described with reference to the drawings. However, the scope of the invention is not limited to the illustrated embodiments.

As noted in the BACKGROUND, there have been developed systems for preventing operator's erroneous input of information about an order received, configured to, in response to operator's operations to input order information into a corresponding input field in a setup screen, use machine learning to determine a candidate for a value to be specified in another input field and indicate the candidate in the corresponding input field in the setup screen. For example, JP-A No. 2015-176293 discloses the technique to, in response to a change of a value for a certain setup option among recommended print settings displayed on a display of an information processing apparatus, determine a value for another setup option to be changed together with the changed setup option, on the basis of the history data of print settings, and indicate the determined value as a recommended print setting.

When obtaining a candidate for a setting value for certain kinds of print products that can change in paper size or paper type from a certain month or can change in design according to the season, such as periodicals and magazines, by just using accumulated history data of print settings, an evaluation value (for example, one of support, confidence and lift) calculated for the obtained candidate becomes low. It may cause a problem that the disclosed system does not indicate an appropriate candidate for a setting value that is actually suitable for such kinds of print products.

Figure 1:
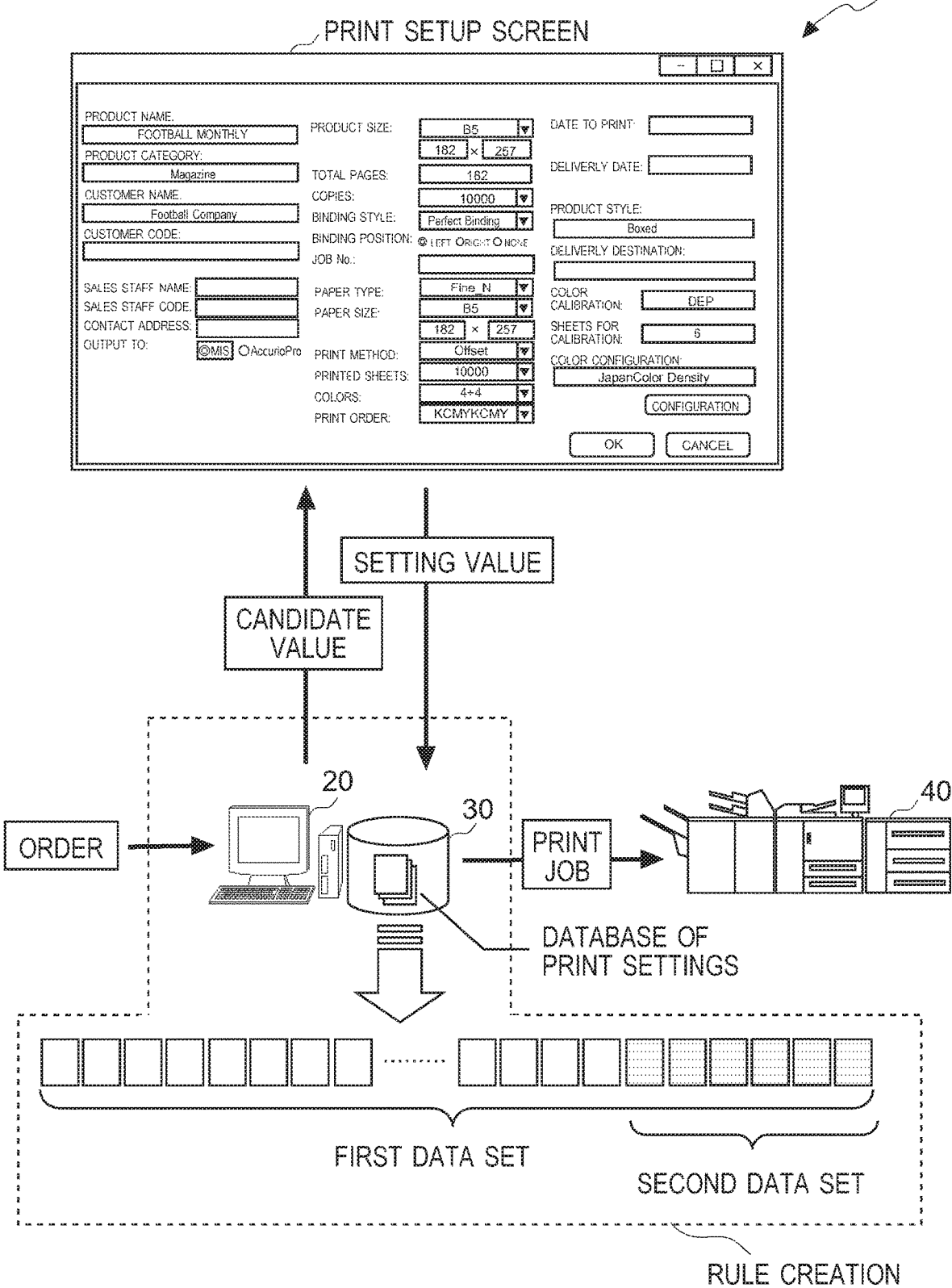
FIG. 1 is a schematic diagram illustrating outline operations of a setup-information input system according to one embodiment of the present invention.

In view of that, the following technique for assisting operator' input, for use in setup-information input system 10 illustrated FIG. 1, is provided as an embodiment of the present invention. The setup-information input system 10 includes information input apparatus 20, storage device 30 and image forming apparatus 40, where the information input apparatus 20 is configured to allow an operator to input order information (setting values) into corresponding input fields in a setup screen (for example, input fields for respective setup options shown in a print setup screen) displayed by the display of the information input apparatus 20, and the image forming apparatus 40 is configured to receive a print job and perform print processing according to setting values specified in the setup screen displayed by the display of information input apparatus 20. First, sets of setting values that had been specified for jobs used for print processing, associated with time and date information, are accumulated in a database stored in the storage device 30. A hardware processor of information input apparatus 20 then performs the following operations using the database stored in the storage device 30, when executing a program for controlling the information input apparatus 20 (an input assistance program). That is, the hardware processor receives an operator's operation to specify one or more setting values for respective one or more input fields in a setup screen displayed on the display of the information input apparatus 20, through an input device of the information input apparatus 20. The hardware processor creates a data set from the database, determines at least one candidate value to be indicated in respective at least one input field in the setup screen, and creates a rule that associates the one or more setting values specified by the operator with the at least one candidate value so that a sufficient evaluation value can be calculated for the at least one candidate value. In concrete terms, the hardware processor creates a first data set by extracting from the database sets of setting values, each including the one or more setting values specified by the operator (for example, the title of print products to be printed). The hardware processor uses the first data set to determine at least one candidate value to be indicated in at least one of the other input fields (for example, input fields for each of which no setting value is specified by the operator) in the setup screen, respectively, and creates a rule that associates the one or more setting values specified by the operator with the at least one candidate value. For example, the hardware processor may use machine learning to extract from the first data set combinations of setting values specified for past jobs (by using, for example, an association analysis), and then use the extracted combinations to create a rule, where the rule provides at least one candidate for a setting value that is likely to be specified (for example, frequently appears in the first data set) together with the one or more setting values already specified by an operator's input. The hardware processor then calculates an evaluation value indicating association (a degree of association) between the one or more setting values specified by the operator with the at least one candidate value, to judge whether the evaluation value is not less than a predetermined criterion, where examples of the evaluation value include support, confidence and lift used in association analysis. On finding no candidate value for which the evaluation value being not less than the predetermined criterion was calculated, the hardware processor creates a second data set by trimming the first data set by using a data-trimming rule in terms of time, where examples of the data-trimming rule in terms of time include a period to be used for trimming the first data set (a time period to go back in history, starting at the latest data in the first data set or the present), an interval to be used for extracting sets of setting values from the first data set periodically, and a series of time and date information at certain intervals. By using the second data set, the hardware processor determines at least one second candidate value to be indicated in the at least one of the other input fields, respectively, and creates a rule that associates the one or more setting values specified by the operator with the at least one second candidate value. After that, in response to detecting an operator's input operation on a certain input field among the at least one of the other input fields (input fields for each of which the rule has been created) in the setup screen, the hardware processor causes the display to indicate a candidate value determined according to the rule, in the certain input field. When creating the second data set by extracting, from the first data set, sets of setting values associated with the latest time and date information for the period starting at the latest data in the first data set or the present, and determining, by using the second data set, the at least one second candidate value, the hardware processor may calculate a second evaluation value indicating a degree of association between the one or more setting values specified by the operator with the at least one second candidate value. On finding no second candidate value for which the second evaluation value being not less than the predetermined criterion was calculated, the hardware processor may change the data-trimming rule and re-create the second data set according to the data-trimming rule changed. On the other hand, on finding a second candidate value for which the second evaluation value being not less than the predetermined criterion was calculated, the hardware processor may calculate the second evaluation value for the second candidate value repeatedly while increasing the period and re-creating the second data set by using the period, and check a change of the second evaluation value with an increase of the period. On finding a decrease of the second evaluation value in the checking, the hardware processor may trim the first data set by extracting the sets of setting values from the first data set by using the period immediately before the decrease, to fix the second data set. On finding an increase of the second evaluation value in the checking, the hardware processor may define an interval to be used for extracting sets of setting values from the first data set periodically, for the data-trimming rule, and trim the first data set by extracting the sets of setting values from the first data set at the intervals, to fix the second data set. Alternatively, the hardware processor may define a series of time and date information at certain intervals, to be used for extracting sets of setting values from the first data set periodically, for the data-trimming rule, and trim the first data set by extracting the sets of setting values associated with the series of time and date information from the first data set at the intervals, to fix the second data set. When finding in the first data set information indicating an interval to be used for extracting sets of setting values from the first data set periodically, the hardware processor may use the interval extracted from the first data set to trim the first data set by extracting the sets of setting values at the intervals, to create the second data set. After creating the second data set, the hardware processor may cause the display to display the second data set, and prompt an operator to judge an appropriateness of the second data set. On receiving an operator's operation indicating that the second data set is judged as being inappropriate, through the input device, the hardware processor may change the data-trimming rule to re-create the second data set.

As described above, the information input apparatus in the setup-information input system is configured to use a first data set created based on one or more setting values specified by the operator, to determine at least one candidate value to be indicated in at least one of the other input fields in the setup screen, respectively. The information input apparatus is further configured to, when finding no candidate value for which an evaluation value being not less than a predetermined criterion was calculated, perform the following operations in view of the characteristics of a print product to be printed. That is, the information input apparatus creates a second data set by using a part of sets of setting values in the first data set, and determines, by using the second data set, at least one second candidate value to be indicated in the at least one of the other input fields, respectively, and creates a rule that associates the one or more setting values specified by the operator with the at least one second candidate value. Thereby, the information input apparatus can indicate a candidate value in an input field in a setup screen (for example, a print setup screen) with improved accuracy.

EMBODIMENT

Figure 2:
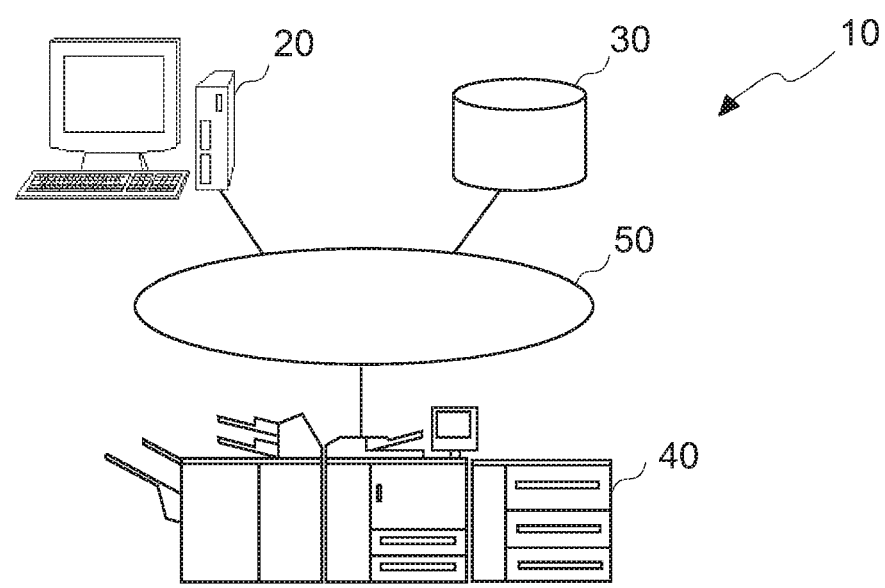
FIG. 2 is a schematic diagram illustrating an example of the constitution of a setup-information input system according to one embodiment of the present invention.
Figure 3A:
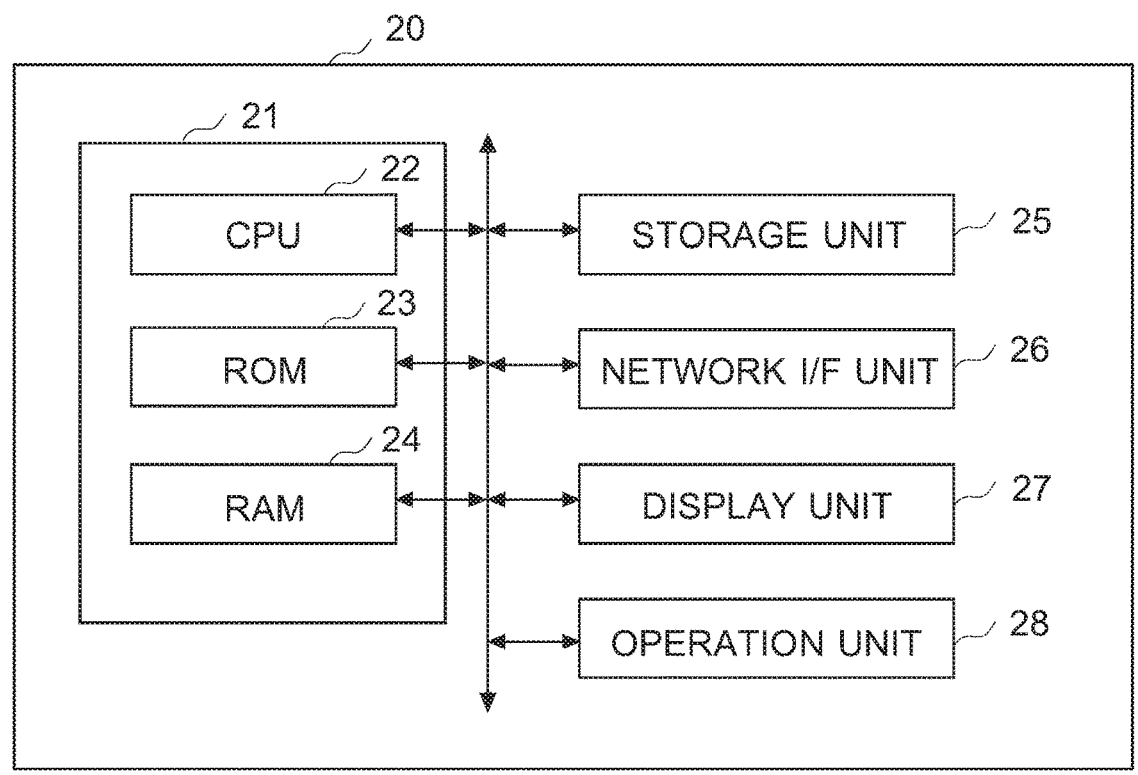
FIGS. 3A and 3B are block diagrams illustrating an example of the constitution of an information input apparatus according to one embodiment of the present invention.
Figure 3B:
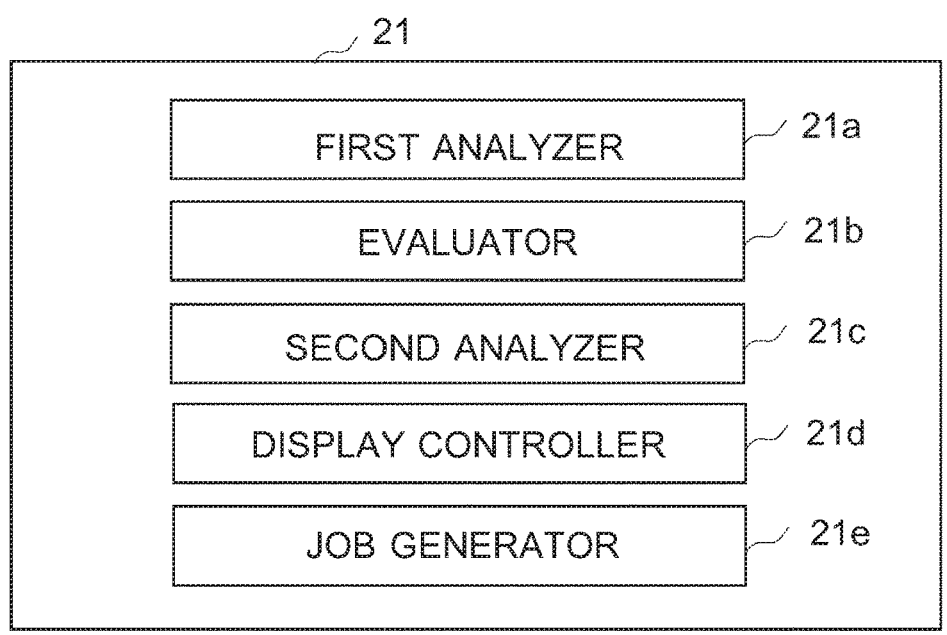
Figure 4:
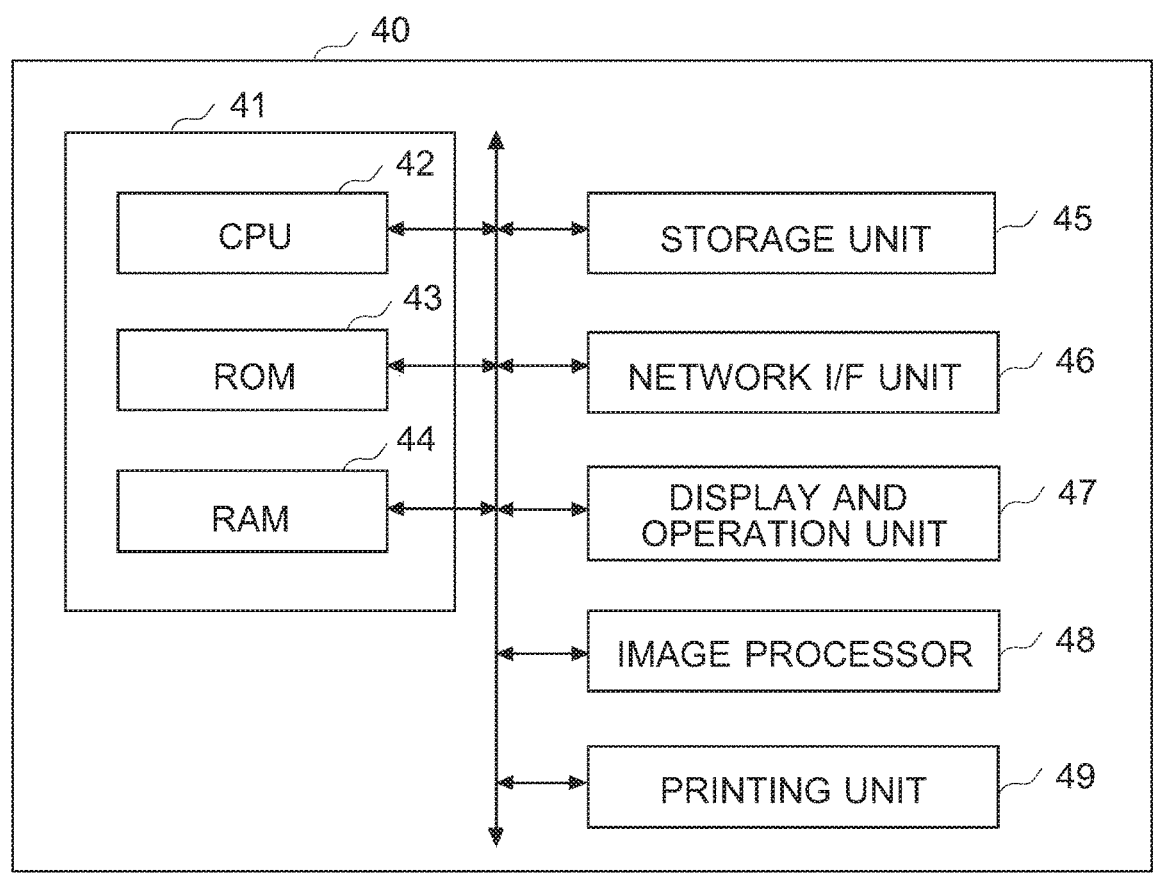
FIG. 4 is a schematic diagram illustrating an example of the constitution of an image forming apparatus according to one embodiment of the present invention.
Figure 7:
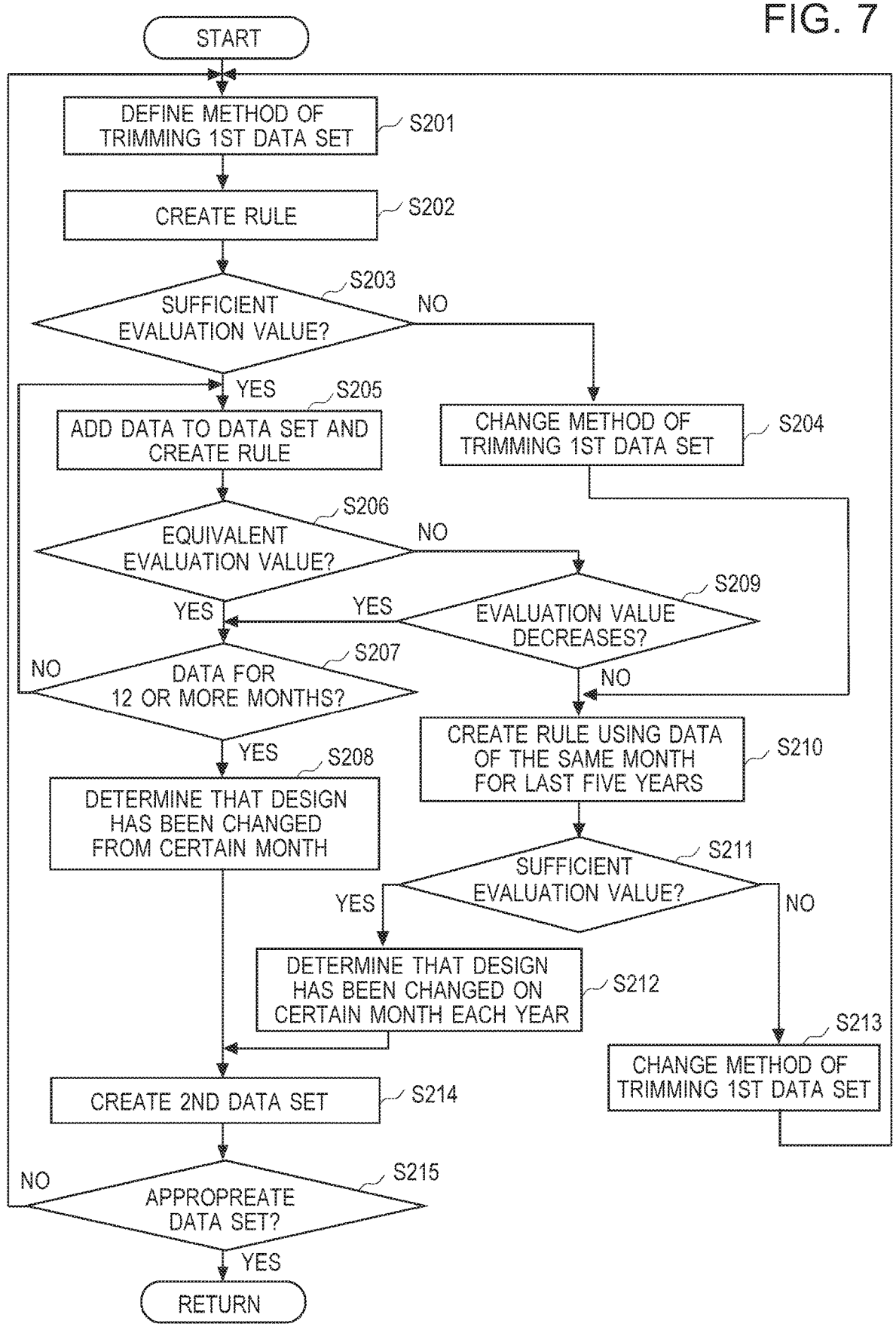
FIG. 7 is a flowchart illustrating an example of operations (creation of a second data set) of the information input apparatus according to one embodiment of the present invention.

In order to describe an embodiment of the present invention in more in detail, a description is given of an input assisting method, a non-transitory computer-readable recording medium storing an input assistance program and a setup-information input system, with reference to FIG. 2 through FIG. 11. FIG. 2 is a schematic diagram illustrating an example of the constitution of a setup-information input system according to the present embodiment. FIGS. 3A and 3B are block diagrams illustrating an example of the constitution of an information input apparatus. FIG. 4 is a schematic diagram illustrating an example of the constitution of an image forming apparatus. FIG. 5 is a diagram illustrating an example of print settings (a first data set). FIGS. 6 and 7 are flowcharts illustrating an example of operations of the information input apparatus. FIGS. 8 to 11 are diagrams illustrating examples of a print setup screen displayed by the information input apparatus.

As illustrated in FIG. 2, setup-information input system 10 according to the present embodiment includes information input apparatus 20, storage device 30 and image forming apparatus 40. These devices are communicatively connected to each other via communication network 50, where examples of the communication network 50 include a LAN (Local Area Network) and WAN (Wide Area Network) defined by specifications, such as Ethernet, Token Ring and FDDI (Fiber-Distributed Data Interface).

Information Input Apparatus:

Information input apparatus 20 is a computing device like a personal computer and is configured to generate a job and send the job to image forming apparatus 40. Information input apparatus 20 includes, as illustrated in FIG. 3A, built-in controller 21, storage unit 25, network interface (I/F) unit 26, display unit 27 and operation unit 28.

Built-in controller 21 includes CPU (Central Processing Unit) 22 as a hardware processor, and memories including ROM (Read Only Memory) 23 and RAM (Random Access Memory) 24. CPU 22 reads out control programs stored in ROM 23 or storage unit 25, loads the control programs onto RAM 24, and executes the control programs, thereby controlling operations of the components of information input apparatus 20.

As illustrated in FIG. 3B, built-in controller 21 (CPU 22) is configured to work as first analyzer 21a, evaluator 21b, second analyzer 21c, display controller 21d and job generator 21e.

First analyzer 21a is configured to perform a rule creation as follows. First analyzer 21a receives an operator's input operation through operation unit 28 to specify one or more setting values for respective one or more input fields in a setup screen (for example, an input field or input fields each for a setup option specified for a job, shown in a print setup screen or a criterion input screen which will be described later) displayed on display unit 27. First analyzer 21a then extracts from the database sets of setting values, each including the one or more setting values specified by the operator, to create a first data set. First analyzer 21a uses the first data set to determine at least one candidate value to be indicated in at least one of the other input fields (input fields for setup options other than those for which the operator specified the one or more setting values) in the setup screen, respectively. First analyzer 21a then creates a rule that associates the one or more setting values specified by the operator with the at least one candidate value. The rule represents a combination of two events occurring in this order, where the first event corresponds to the antecedent part (also referred to as the IF part or LHS part) of the rule and is that one or more setting values are input into a respective one or more input field in a setup screen, and the second event corresponds to the consequent part (also referred to as the THEN part or RHS part) of the rule and is that one or more other setting values are input into a respective one or more other input field in a setup screen (in other words, the rule uses one or more setting values specified for respective one or more input fields for setup option or options in the antecedent part, to present at least one or more values that are likely to be specified for one or more other setup options together with the one or more setting values, as the consequent part). For example, the hardware processor may use machine learning to extract from the first data set combinations of setting values specified for past jobs (by using, for example, an association analysis), and then use the extracted combinations to create a rule, where the rule provides at least one candidate value that is likely to be specified (for example, frequently appears in the first data set) together with the one or more setting values already specified by an operator's input. Examples of setting values to be used for creating the first data set include data items indicating the kind of a print product (including the name of the print product to be printed and the customer name that ordered the print product) and a period to be used for extracting sets of setting values specified for past jobs from the database. In response to receiving an operator's operation through operation unit 28 to select a candidate value indicated in an input field in the setup screen displayed on display unit 27, first analyzer 21a handles the selected candidate value as a setting value specified by the operator, to create the first data set by using the candidate value together with the one or more setting values specified by the operator.

Evaluator 21b is configured to perform the following operations. For the at least one candidate value determined by first analyzer 21a, evaluator 21b calculates an evaluation value indicating a degree of association between the one or more setting values specified by the operator with the at least one candidate value, to judge whether the evaluation value is not less than a predetermined criterion. The evaluation value is an index used for evaluation of a rule. As the evaluation value, at least one of the support, confidence or lift used as metrics of the association analysis can be used. For example, the support and confidence and lift of each rule are given by the following mathematical expressions, where the antecedent part of the rule indicates an event that one or more setting values are input into respective one or more input fields each for a certain setup option in a setup screen, and the consequent part of the rule indicates an event that one or more other setting values are input into a respective one or more other input field in a setup screen after the event of the antecedent part (or at least one candidate value that is likely to be specified together with the one or more setting values in the antecedent part is presented):

Support=(the number of records in the database, including all the setting values in the antecedent and consequent parts of the rule)/(the total number of records in the database);

Confidence=(the number of records in the database, including all the setting values in the antecedent and consequent parts of the rule)/(the number of records in the database, including all the setting values in the antecedent part of the rule); and Lift=Confidence/(the number of records in the database, including all the setting values in the consequent part of the rule).

Second analyzer 21c is configured to perform a rule re-creation as follows, when finding no candidate value for which the evaluation value being not less than the predetermined criterion was calculated. That is, in response to finding no candidate value for which the evaluation value being not less than the predetermined criterion was calculated, second analyzer 21c creates a second data set by trimming the first data set by using a data-trimming rule in terms of time, where examples of the data-trimming rule in terms of time include a period to be used for trimming the first data set (a time period to go back in history, starting at the latest data in the first data set or the present), an interval to be used for extracting sets of setting values from the first data set periodically, and a series of time and date information at certain intervals to be used for extracting sets of setting values from the first data set periodically. Second analyzer 21c then uses the second data set to determine at least one second candidate value to be indicated in the at least one of the other input fields (for which the at least one candidate value has been determined by first analyzer 21a), respectively, and for the at least one second candidate value, creates a rule that associates the one or more setting values specified by the operator with the at least one second candidate value. For example, second analyzer 21c trims the first data set by extracting from the first data set sets of setting values associated with the time and date information for the period, starting at the latest data in the first data set or the present, to create the second data set; uses the second data set to determine the at least one second candidate value; and calculates the second evaluation value for the at least one second candidate value, to judge whether the second evaluation value is not less than the predetermined criterion. On finding no second candidate value for which the second evaluation value being not less than the predetermined criterion was calculated, second analyzer 21c changes the data-trimming rule and re-creates the second data set according to the data-trimming rule changed. On finding a second candidate value for which the second evaluation value being not less than the predetermined criterion was calculated, second analyzer 21c calculates the second evaluation value for the second candidate value repeatedly while increasing the period and re-creating the second data set by using the period; checks a change of the second evaluation value with an increase of the period; and on finding a decrease of the second evaluation value in the checking, trims the first data set by extracting the sets of setting values from the first data set by using the period immediately before the decrease, to fix the second data set. On finding an increase of the second evaluation value in the checking, second analyzer 21c defines an interval (or a series of time and date information at certain intervals) to be used for extracting sets of setting values from the first data set periodically, for the data-trimming rule, and trims the first data set by extracting the sets of setting values from the first data set at the intervals, to fix the second data set. In this process, on finding information indicating the interval (for example, text string "New Year Special Edition") in the first data set, second analyzer 21c uses the interval extracted from the first data set to trim the first data set by extracting the sets of setting values at the intervals, to create the second data set.

Display controller 21d is configured to perform the following operations. In response to detecting an operator's input operation on a certain input field (an input field for which the rule has been created in a print setup screen) among the at least one of the other input fields in the setup screen displayed on display unit 27, through operation unit 28, display controller 21d causes the display unit 27 to indicate a candidate value determined according to the rule created by second analyzer 21c (or the rule created by first analyzer 21a, if the candidate value calculated by evaluator 21b is not less than the predetermined criterion), in the certain input field.

Job generator 21e is configured to generate a job for instructing to perform print processing to image forming apparatus 40, using the setting values specified in input fields for setup options for the job, shown in the setup screen (for example, print settings configured on a print setup screen) displayed on display unit 27.

Herein, the above-mentioned first analyzer 21a, evaluator 21b, second analyzer 21c, display controller 21d and job generator 21e may be constituted as hardware devices. Alternatively, the above-mentioned first analyzer 21a, evaluator 21b, second analyzer 21c, display controller 21d and job generator 21e (in particular, first analyzer 21a, evaluator 21b, second analyzer 21c and display controller 21d) may be provided by an input assistance program, which causes built-in controller 21 to function as these sections when being executed by CPU 22. That is, built-in controller 21 may be configured to serve as the first analyzer 21a, evaluator 21b, second analyzer 21c, display controller 21d and job generator 21c (in particular, first analyzer 21a, evaluator 21b, second analyzer 21c and display controller 21d), when CPU 22 executes the input assistance program.

The input assistance program may be embedded in a printer driver or a direct-print utility program. In an example of generation of a PDL (Page Description Language) job written in page description languages, such as PJL (Printer Job Language), PS (PostScript) and PCL (Printer Control Language), when executing the input assistance program embedded in a printer driver, built-in controller 21 (display controller 21d) causes display unit 27 of information input apparatus 20 to display a candidate value in a print setup screen being a graphical user interface given by the printer driver. In another example of generation of a job which enables direct printing, such as PDF (Portable Document Format), XPS (XML Paper Specification), OOXML (Office Open XML) and ODF (OpenDocument Format) jobs, when executing the input assistance program embedded in a direct-print utility program, built-in controller 21 (display controller 21d) causes display unit 27 of information input apparatus 20 to display a candidate value in a print setup screen being a graphical user interface given by the direct-print utility program.

Storage unit 25 is a non-transitory computer-readable recording medium including a HDD (Hard Disk Drive) and/or a SSD (Solid State Drive), which stores programs which when being executed causes CPU 22 to control the components of information input apparatus 20, information about processing and functions of information input apparatus 20, data of screens including a print setup screen, a criterion input screen and a screen showing a second data set, a job to be sent to image forming apparatus 40, a first data set created from the database, a second data set created from the first data set, and other data.

Network I/F unit 26 includes a NIC (Network Interface Card) and/or a modem. Network I/F unit 26 communicatively connects information input apparatus 20 to communication network 50 so as to access the database stored in storage device 30 and send a job to image forming apparatus 40.

Display unit 27 includes a display like a LCD (liquid crystal display) or an OEL (organic electroluminescence) display, so as to display a print setup screen, a criterion input screen and a screen showing a second data set, according to instructions given by display controller 21d.

Operation unit 28 includes input devices, such as a mouse and a keyboard, which allows an operator to perform operations to input setting values into input fields for setup options and operations to select candidate values for setting options, in the print setup screen or the criterion input screen.

Storage Device:

Storage device 30 is a device for storing various kinds of information used by information input apparatus 20 in a form of database. In the present embodiment, storage device 30 stores a database including sets of setting values that had been specified for jobs used for past print processing, associated with time and date information, and serves information input apparatus 20 with the database so that information input apparatus 20 can determine at least one candidate value to be indicated in respective at least one input field in a setup screen.

Image Forming Apparatus:

Image forming apparatus 40 is an apparatus configured to perform image forming processing according to a job received from information input apparatus 20, where examples of image forming apparatus 40 include a MFP (multi-functional peripheral). Image forming apparatus 40 includes, as illustrated in FIG. 4, built-in controller 41, storage unit 45, network interface (I/F) unit 46, display and operation unit 47, image processor 48 and printing unit 49.

Built-in controller 41 includes CPU 42 as a hardware processor, and memories including ROM 43 and RAM 44. CPU 42 reads out control programs stored in ROM 43 or storage unit 45, loads the control programs onto RAM 44, and executes the control programs, thereby controlling operations of the components of image forming apparatus 40.

Storage unit 45 is a non-transitory computer-readable recording medium including a HDD and/or a SSD. Storage unit 45 stores programs which, when being executed, cause CPU 42 to control the components of image forming apparatus 40; information about processing and functions of image forming apparatus 40; a job received from information input apparatus 20; image data created by image processor 48; and other data.

Network I/F unit 46 includes a NIC and/or a modem. Network I/F unit 46 communicatively connects image forming apparatus 40 to communication network 50 so that image forming apparatus 40 can receive a job from information input apparatus 20.

Display and operation unit 47 is configured to display various screens relating to printing and allow an operator to perform, on the screens, various kinds of operations relating to printing. Examples of the display and operation unit 47 include a touch screen in which a pressure-sensitive operation unit (a touch sensor) composed of lattice-shaped transparent electrodes is arranged on a display unit.

Image processor 48 serves as a RIP (raster image processor) and is configured to parse a job to create intermediate data and then perform rendering on the intermediate data to create raster data, where the series of these processes is referred to as "rasterization". Image processor 48 is further configured to perform image processing, such as screening, tone correction, density-balance adjustment, thinning, halftoning and other processing, on image data as needed, and output the resulting image data to printing unit 49.

Printing unit (print engine) 49 is configured to perform print processing on the basis of image data. In concrete terms, printing unit 49 includes an exposure unit, an image forming unit, an intermediate transfer belt, a second transfer roller, a fixing unit, and a conveyance unit. The exposure unit is configured to irradiate a photoreceptor drum with a laser beam according to image data so as to perform an exposure process. The image forming unit includes the photoreceptor drum, a developing section, a charging section, a photoreceptor cleaning section, and a first transfer roller, and is configured to form on the photoreceptor drum a toner image in each of CMYK colors. The intermediate transfer belt is driven by rollers so as to work as an intermediate transfer body which conveys the toner images formed by the image forming unit onto a print medium. The second transfer roller is configured to transfer the toner images on the intermediate transfer belt onto a print medium. The fixing unit is configured to fix the images transferred on the print medium. The conveyance unit includes components for conveying print media, for example, a feed roller, a registration roller, a loop roller, a reverse roller, and an output roller.

It should be noted that FIG. 2 to FIG. 4 illustrate an example of setup-information input system 10 according to the present embodiment for illustrative purpose only, and the constitution and operations of each apparatus in the system may be modified appropriately, as far as the operations of information input assistance (control operations of information input apparatus 20) given in the present embodiment can be achieved. For example, through setup-information input system 10 illustrated in FIG. 2 includes information input apparatus 20 and storage device 30 being separated bodies, the storage device 30 may be omitted, if information input apparatus 20 includes storage device 30 in its body (in other words, if storage unit 25 of information input apparatus 20 stores the above-described database). For another example, if the system includes a storage device for storing jobs generated by information input apparatus 20, image forming apparatus 40 may be omitted or the system may further include a controller for controlling the jobs.

Outline Operations of Information Input Assistance:

Hereinafter, a description is given of outline operations of information input assistance, with respect to print processing of a fictitious monthly magazine named "Football Monthly". FIG. 5 is a diagram illustrating an example of a first data set of print setup information, extracted from a database including sets of setting values that had been specified for jobs used for past print processing, associated with time and date information, accumulated by a certain printing company. In concrete terms, the first data set is prepared by extracting, from the recodes of setting values specified for all the jobs registered in the database, sets of setting values, each including the product name of "Football Monthly". The first data set illustrated in FIG. 5 is a data matrix, where each column of the matrix corresponds to a setup option to be used for creating the LHS part or RHS part of a rule and each row of the matrix represents an extracted record (or set) of setting values specified for a past job. Since the monthly magazine named "Football Monthly" has the following characteristics, built-in controller 21 of information input apparatus 20 creates a second data set from the first data set by using the following methods, to determine at least one candidate value to be indicated together with one or more setting values already specified by an operator in a setup screen (at least one setting value that is likely to be specified together with one or more setting values already specified by an operator's input), in accordance with the characteristics of the magazine, by using the second data set.

First Characteristics:

As can be seen from the sets of setting values in FIG. 5, the magazine changed in paper type from "Fine_N" to "Coat_N" and in paper size from "182 mm×257 mm" to "220 mm×282 mm" on and after January 2017 (please see the sets of setting values for PERIOD A in FIG. 5). The first data set shown in FIG. 5 includes almost equal numbers of sets of setting values including paper type "Fine_N" and those including paper type "Coat_N". Therefore, when built-in controller 21 determines candidate values for the paper type and paper size by using the all the sets of setting values shown in FIG. 5, creates a rule which uses the setting values in the LHS columns in FIG. 5 (the anticipating part of the rule) to present the candidate values for the paper type and the paper size that is likely to be specified together with the setting values in the LHS columns, and calculates an evaluation value for the candidate values, it is difficult to find values for the paper type and paper size, for which a sufficient evaluation value (an evaluation value being not less than a predetermined criterion) is calculated (in other words, it is difficult to determine appropriate candidate values for the paper type and paper size). Therefore, built-in controller 21 creates a second data set by using the following methods.

As the first method, built-in controller 21 creates a second data set on the assumption that the design of the print product has been changed from a certain time (a certain month) in the past. That is, built-in controller 21 defines a period to be used for trimming the first data set shown in FIG. 5, and extracts, from the first data set, sets of setting values associated with the latest time and date information for the period, starting at the latest data in the data set (July 2017), to create the second data set. Built-in controller 21 then determines, by using the second data set, the candidate values for the paper type and paper size, which are to be used for the RHS or consequent part of a rule, and calculates an evaluation value for the candidate values determined by using the second data set. When finding a candidate value for which the evaluation value being not less than the predetermined criterion is calculated, built-in controller 21 repeatedly calculates an evaluation value for the candidate values determined by using the second data set while increasing the period and re-creating the second data set by using the period. In this process, in consideration with publication of a special edition of the magazine, built-in controller 21 always creates the second data set including sets of setting values for at least three months. Further, built-in controller 21 always creates the second data set including sets of setting values for at most one year (from August 2016 to July 2017). For example, built-in controller 21 defines the period being three months and extracts, from the first data set, sets of setting values associated with the latest time and date information from May 2017 to July 2017, to create the second data set. Built-in controller 21 then determines, by using the second data set, the candidate values for the paper type and the paper size, and calculates an evaluation value for the candidate values determined by using the second data set. In the calculation, the calculated evaluation value is not less than the predetermined criterion. Built-in controller 21 then repeatedly calculates the evaluation value for the candidate values determined by using the second data set while increasing the period by one month (adding a set of setting values dated the previous month, to the previous second data set repeatedly). For example, the evaluation value calculated by the second data set including setting values associated with the time and date information from January 2017 to July 2017, is almost equivalent to that calculated by the second data set including setting values associated with the latest time and date information from May 2017 to July 2017. On the other hand, when built-in controller 21 further increases the period and calculates the evaluation value for the candidate values determined by using the second data set including setting values associated with the latest time and date information from December 2016 or the month before December 2016 to July 2017, the calculated evaluation value decreases with the increase of the period. From this fact, it can be determined that the design of the magazine has been changed from January 2017, and built-in controller 21 uses the sets of setting values for the seven months from January 2017 to July 2017 (the period immediately before the decrease of the evaluation value), to fix the second data set.

In the first method, the calculations of the evaluation values were performed by using the sets of setting values for at most seven months. If the design of the magazine changes according to season or on a certain month every year, it can be considered that the evaluation values in the first method, that were calculated by using a data set including sets of setting values for one year or less, do not reflect this kind of change. As the second method, built-in controller 21 creates the second data set on the assumption that the design of the print product changed according to season or on a certain month every year. Built-in controller 21 obtains sets of setting values associated with the time and date information of the same month (or months in the same season) every year for the last several years (for example, the last three years) from the first data set shown in FIG. 5, to create the second data set. Built-in controller 21 then determines, by using the second data set, the candidate values for the paper type and paper size, and calculates the evaluation value for the candidate values determined by using the second data set. For example, the evaluation value calculated by the second data set including setting values associated with the time and date information of July 2017, July 2016 and July 2015, is an insufficient value (being less than the predetermined criterion), which indicates that the design of the magazine changes irrespective of month.

From the result of the above-described calculations using two methods of creating the second data set, built-in controller 21 determines that the magazine named "Football Monthly" has changed in design (paper type and paper size) from January 2017, and fixes sets of setting values associated with the time and date information of January 2017 and after in the first data set, as the second data set. Built-in controller 21 uses the second data set to determine candidate values for the paper type and the paper size ("Coat_N" for the paper type and "220 mm×282 mm" for the paper size), and creates a rule indicating that if an operator specifies "Football Monthly" for the input field for "Product Name" then candidate values "Coat_N" and "220 mm×282 mm" appear in the input fields for paper type and paper size, respectively.

Second Characteristics:

As can be seen from the records of setting values in FIG. 5, the circulation of the magazine decreases in the off-season of football (from January to March) in comparison with that in the on-season (please see the records of setting values for PERIOD B in FIG. 5). The first data set shown in FIG. 5 includes almost equal numbers of records of setting values including the circulation of 50000 copies and those including the circulation of 100000 copies. Therefore, when built-in controller 21 determines candidate values for the paper type and the circulation by using the all the records of setting values shown in FIG. 5, creates a rule which uses the setting values in the LHS columns in FIG. 5 (the anticipating part of the rule) to present the candidate values for the paper type and the circulation that is likely to be specified together with the setting values in the LHS columns, and calculates an evaluation value for the candidate values, it is difficult to find values for the paper type and the circulation, for which a sufficient evaluation value (an evaluation value being not less than a predetermined criterion) is calculated (in other words, it is difficult to determine appropriate candidate values for the paper type and the circulation). Therefore, built-in controller 21 creates a second data set by using the following methods.

As the first method, built-in controller 21 creates a second data set on the assumption that the design of the print product has been changed from a certain time (a certain month) in the past. That is, built-in controller 21 defines a period to be used for trimming the first data set shown in FIG. 5, and extracts, from the first data set, sets of setting values associated with the latest time and date information for the period, starting at the latest data in the data set (July 2017), to create the second data set. Built-in controller 21 then determines, by using the second data set, the candidate value for the circulation, which is to be used for the RHS or consequent part of a rule, and calculates an evaluation value for the candidate value determined by using the second data set. When finding a candidate value for which the evaluation value being not less than the predetermined criterion is calculated, built-in controller 21 repeatedly calculates an evaluation value for the candidate value determined by using the second data set while increasing the period and re-creating the second data set by using the period. Similarly to the calculations for the first characteristics, in consideration with publication of a special edition of the magazine, built-in controller 21 always creates the second data set including sets of setting values for at least three months. For example, built-in controller 21 defines the period being four months and extracts from the first data set sets of setting values associated with the time and date information from April 2017 to July 2017, to create the second data set. Built-in controller 21 then determines, by using the second data set, the candidate value for the circulation, and calculates an evaluation value for the candidate value determined by using the second data set. In the calculation, the evaluation value is not less than the predetermined criterion. Built-in controller 21 then repeatedly calculates the evaluation value for the candidate value determined by using the second data set while increasing the period by one month (adding setting values dated the previous month to the previous second data set). For example, when built-in controller 21 increases the period by one month (adds sets of setting values associated with the time and date information from March 2017 to January 2017 one month by one month to the previous second data set) and calculates the evaluation value for the candidate value determined by using the second data set repeatedly, the calculated evaluation value decreases together with the increase of the period. On the other hand, when built-in controller 21 further increases the period by one month (adds sets of setting values associated with the time and date information from December 2016 to August 2016 one month by one month to the previous second data set) and calculates the evaluation value for the candidate value determined by using the second data set repeatedly, the calculated evaluation value increases together with the increase of the period, which indicates that the assumption about the design change of the print product is incorrect.

The first method made it clear that the circulation of the magazine has not changed from a certain time (a certain month). If the design of the magazine changes according to season or on a certain month every year, it can be considered that the evaluation values in the first method, that were calculated by using a data set including sets of setting values for one year or less, do not reflect this kind of change. As the second method, built-in controller 21 creates the second data set on the assumption that the design of the print product changes according to season or on a certain month every year. Built-in controller 21 obtains sets of setting values associated with the time and date information of the same month (or months in the same season) every year for the last several years (for example, the last three years) from the first data set shown in FIG. 5, to create the second data set. Built-in controller 21 then determines, by using the second data set, the candidate value for the circulation, and calculates the evaluation value for the candidate value determined by using the second data set. For example, the evaluation value calculated by the second data set including setting values associated with the time and date information of July 2017, July 2016 and July 2015, and the evaluation value calculated by the second data set including setting values associated with the latest time and date information of January 2017, January 2016 and January 2015 are equivalent to each other and are not less than the predetermined criterion. It indicates that the design of the magazine changes according to month.

From the result of the above-described calculations using two methods of creating the second data set, built-in controller 21 determines that the magazine named "Football Monthly" has changed in circulation on a certain month (or certain months in the same season) every year, and fixes sets of setting values associated with the time and date information of the certain month (certain months in the same season) every year, as the second data set. Built-in controller 21 uses the second data set to determine a candidate value for the circulation (the circulation of 50000 copies for each of January to March, and the circulation of 100000 copies for each of April to December) and creates a rule indicating that if an operator specifies "Football Monthly" in input field for "Product Name" then a candidate value ("50000" or "100000" depending on the present date) appears in the input field for circulation.

Operations of Information Input Apparatus:

Hereinafter, a description is given of concrete operations of information input apparatus 20 according to the present embodiment. CPU 22 of information input apparatus 20 reads out an input assistance program stored in ROM 23 or storage unit 25, loads the program onto RAM 24, and executes the program, thereby executing the steps of the flowcharts illustrated in FIGS. 6 and 7. It is assumed that storage device 30 stores a database including sets of setting values that had been specified for jobs used for past print processing, associated with time and date information, prepared in advance to the steps.

As illustrated in FIG. 6, built-in controller 21 of information input apparatus 20 monitors data in the database (Step S101), and when finding an update of the data (YES in Step S101), starts creating an optimal rule that presents at least one candidate value, using machine learning (Step S102).

Figures 9, 10:
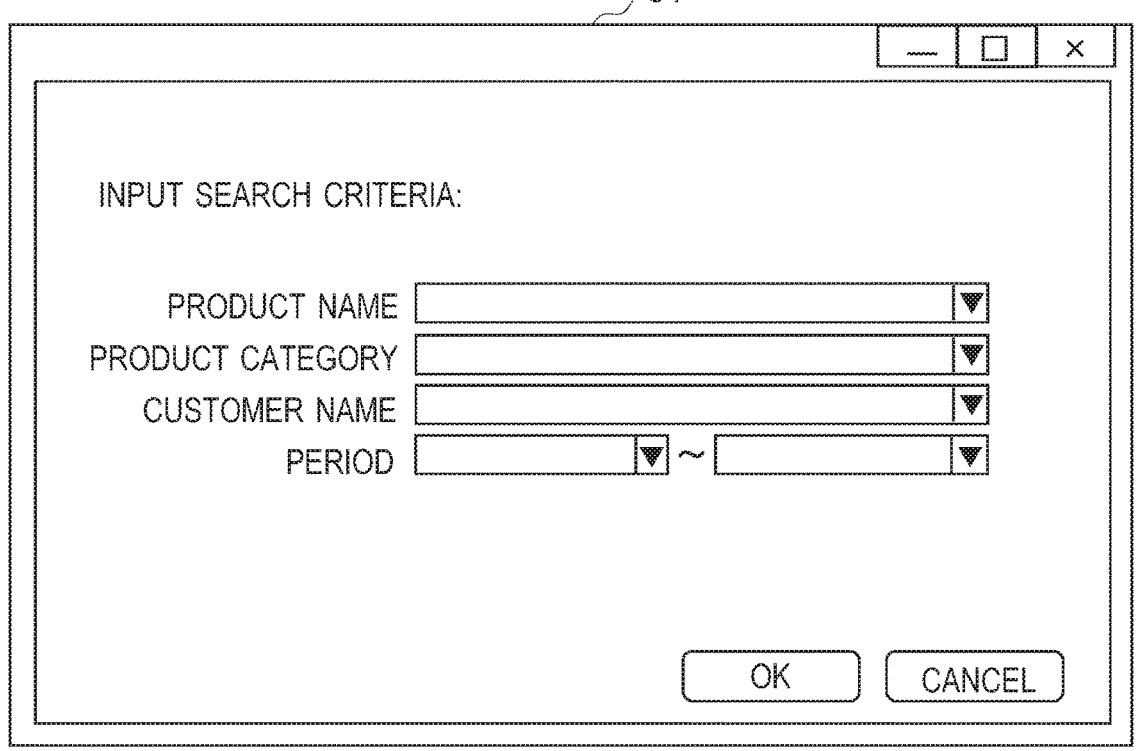
FIG. 9 is a diagram illustrating an example of a criterion input screen displayed by the information input apparatus according to one embodiment of the present invention.
FIG. 10 is a diagram illustrating an example of a part of the print setup screen displayed by the information input apparatus according to one embodiment of the present invention.

After the update of the data, built-in controller 21 (first analyzer 21*a*) receives an operator's operation through operation unit 28 to specify one or more setting values for respective one or more input fields in a setup screen displayed on display unit 27 (Step S103). For example, for creating a job by prompting an operator to input through operation unit 28 setting values into respective input fields in a setup screen displayed on display unit 27, built-in controller 21 (first analyzer 21*a*) causes display unit 27 to display print setup screen 60 as illustrated in FIG. 8 or criterion input screen 61 as illustrated in FIG. 9, and receives an operator's operation through operation unit 28 to input one or more setting values into respective one or more input fields in the screen. Built-in controller 21 (first analyzer 21*a*) may cause display unit 27 to display criterion input screen 61 immediately after finding the update of the data, or may cause display unit 27 to display criterion input screen 61 in response to an operator's pressing action on a certain button (in this case, "Configuration" button) prepared in print setup screen 60. The one or more setting values input by the operator is used for creating a first data set from the database stored in storage device 30. Examples of the one or more setting values to be used for creating a first data set include a product name, a customer name, and a period to be used for trimming the first data set (for extracting setting values from the first data set). However, the one or more setting values to be used for creating a first data set is not limited to those, and arbitrary information may be used for creating a first data set. Built-in controller 21 (first analyzer 21*a*) then creates a first data set by extracting, from the database, sets of setting values, each including the one or more setting values specified by the operator (Step S104).

Next, built-in controller 21 (first analyzer 21*a*) uses the first data set to determine at least one candidate value to be indicated in at least one of the other input fields (input fields for which no candidate value is specified by the operator) in the screen, respectively, and creates a rule that associates the one or more setting values specified by the operator with the at least one candidate value (Step S105). Built-in controller 21 (evaluator 21*b*) calculates, for the rule, an evaluation value indicating a degree of association between the one or more setting values specified by the operator with the at least one candidate value, to judge whether the evaluation value is not less than a predetermined criterion (in other words, whether a candidate value for which a sufficient evaluation value is calculated has been found) (Step S106).

Finding a candidate value for which the evaluation value being not less than the predetermined criterion was calculated (YES in Step S106), built-in controller 21 goes to Step S109. Finding no candidate value for which the evaluation value being not less than the predetermined criterion was calculated (NO in Step S106), built-in controller 21 (second analyzer 21*c*) creates a second data set by trimming the first data set by using a data-trimming rule in terms of time (Step S107). A detailed description of this step will be given later. Built-in controller 21 (second analyzer 21*c*) then uses the second data set to determine at least one second candidate value to be indicated in the at least one of the other input fields, respectively, and creates a rule that associates the one or more setting values specified by the operator with the at least one second candidate value (Step S108).

In response to detecting an operator's input operation on a certain input field among input fields for which the rule has been created, in a setup screen displayed on display unit 27 (for example, when an operator selects a certain input field in print setup screen 60), built-in controller 21 (display controller 21*d*) determines a candidate value to be indicated in the certain input field, according to the rule created in Step S105 from the first data set or the rule created in Step S108 from the second data set, and causes display unit 27 to indicate the determined candidate value in the certain input field so that an operator can select the candidate value though operation unit 28 (Step S109). For example, FIG. 10 is a diagram illustrating a part of input fields in print setup screen 60, and as illustrated in FIG. 10, when an operator performs operations though operation unit 28 to selects input fields for paper type and paper size in print setup screen 60 displayed on display unit 27 under the condition that "Football Monthly" has been input in the input field for "Product Name" in the screen, built-in controller 21 (display controller 21d) causes display unit 27 to indicate the candidate values "Coat_N" and "220 mm×282 mm" determined by using the rule created in the above description about the First Characteristics in the input fields for paper type and paper size in the screen, respectively. When operator's operations to specify setting values for the input fields in the screen have been completed, built-in controller 21 (job generator 21e) creates a job with the setting values specified for the input fields for respective setup options for the job in the screen, and outputs the created job to image forming apparatus 40 to instruct image forming apparatus 40 to perform print processing (Step S110).

Creation of Second Data Set:

Next, a description is given of the creation of the second data set in Step S107, with reference to the flowchart illustrated in FIG. 7.

First, built-in controller 21 (second analyzer 21c) selects the method of trimming the first data set (for example, determines a data-trimming rule in terms of time) (Step S201). In this case, there are two methods of trimming the first data set of: the first method of trimming the first data set on the assumption that the design of the print product has been changed from a certain time point in the past; and the second method of trimming the first data set on the assumption that the design of the print product changes on a certain month every year. Built-in controller 21 (second analyzer 21c) selects these methods in this order and creates a second data set according to the selected method.

In concrete terms, on the assumption that the design of the print product has been changed from a certain time point, built-in controller 21 (second analyzer 21c) uses sets of setting values for the last three months in the first data set, as the second data set; determines, by using the second data set, at least one second candidate value to be indicated in the at least one of the other input fields (for which at least one candidate value was determined by first analyzer 21a) in the screen, respectively; and creates a rule that associates the one or more setting values specified by the operator with the at least one second candidate value (Step S202). Built-in controller 21 (evaluator 21b) then calculates, for the rule, a second evaluation value indicating a degree of association between the one or more setting values specified by the operator with the at least one second candidate value, to judge whether the second evaluation value is not less than the predetermined criterion (Step S203).

Finding no second candidate value for which the second evaluation value being not less than the predetermined criterion was calculated (NO in Step S203), built-in controller 21 (second analyzer 21c) judges that the design of the print product has not been changed from a certain time point in the past, changes the method of trimming the first data set (Step S204) and goes to Step S210. Finding a second candidate value for which the second evaluation value being not less than the predetermined criterion was calculated (YES in Step S203), built-in controller 21 (second analyzer 21c) extracts, from the first data set, the set of setting values associated with the time and date information of the month previous to the earliest month in the current second data set, and adds the data to the current second data set. Built-in controller 21 (second analyzer 21c) uses the updated second data set to determine at least one second candidate value to be indicated in the at least one of the other input fields, respectively, and creates a rule that associates the one or more setting values specified by the operator with the at least one second candidate value (Step S205). Built-in controller 21 (evaluator 21b) then calculates, for the rule, a second evaluation value indicating a degree of association between the one or more setting values specified by the operator with the at least one second candidate value, to judge whether the second evaluation value is equivalent to the second evaluation value given by the previous calculation (Step S206).

When the calculated second evaluation value is not equivalent to that previously calculated (NO in Step S206), built-in controller 21 (evaluator 21b) judges whether the calculated second evaluation value decreases in comparison with that previously calculated (Step S209). When the calculated second evaluation value is equivalent to that previously calculated (YES in Step S206) or decreases in comparison with that previously calculated (YES in Step 209), built-in controller 21 (second analyzer 21c) judges whether the current second data set includes sets of setting values for a period of twelve or more months (Step S207). When the period is not twelve or more months (NO in Step S207), built-in controller 21 (second analyzer 21c) goes back to Step S205 and extracts, from the first data set, the set of setting values associated with the time and date information of the month previous to the earliest month in the current second data set, and adds the data to the current second data set. When the period is equal to or more than twelve months (YES in Step S207), built-in controller 21 (second analyzer 21c) determines that the design of the print product has changed on the month previous to the decrease of the evaluation value (or determines that the design of the print product has changed within the last twelve months) (Step S208), and uses the sets of setting values associated with time and date information immediately after the month when the design has changed, to fix the second data set (Step S214).

On the other hand, when the calculated second evaluation value increases in comparison with that previously calculated (NO in Step S209), built-in controller 21 (second analyzer 21c) employs the assumption that the design of the print product changes on the certain month every year. That is, built-in controller 21 (second analyzer 21c) extracts the sets of setting values associated with time and date information of the same month every year in the first data set, to create the second data set; determines, by using the second data set, at least one second candidate value to be indicated in the at least one of the other input fields in the screen, respectively; and creates a rule that associates the one or more setting values specified by the operator with the at least one second candidate value (Step S210). If built-in controller 21 (second analyzer 21c) finds information indicating the interval to be used for extracting sets of setting values from the first data set periodically, in the first data set, built-in controller 21 (second analyzer 21c) may use the interval extracted from the first data set to trim the first data set by extracting the sets of setting values at the intervals, to create the second data set. Built-in controller 21 (evaluator 21b) then calculates, for the rule, a second evaluation value indicating a degree of association between the one or more setting values specified by the operator with the at least one second candidate value, to judge whether the second evaluation value is not less than the predetermined criterion (Step S211). Finding a second candidate value for which the second evaluation value being not less than the predetermined criterion was calculated (YES in Step S211), built-in controller 21 (second analyzer 21c) judges that the design of the print product changed on the certain month every year (Step S212), extracts from the first data set the sets of setting values associated with time and date information of the same month every year for the last several years, and creates the second data set (Step S214). Finding no second candidate value for which the second evaluation value being not less than the predetermined criterion was calculated, built-in controller 21 (second analyzer 21c) judges that the design of the print product did not changed on the certain month every year, and changes the method of trimming the first data set (Step S213). Built-in controller 21 then returns to Step S201 to perform the succeeding processes again.

Figure 11:
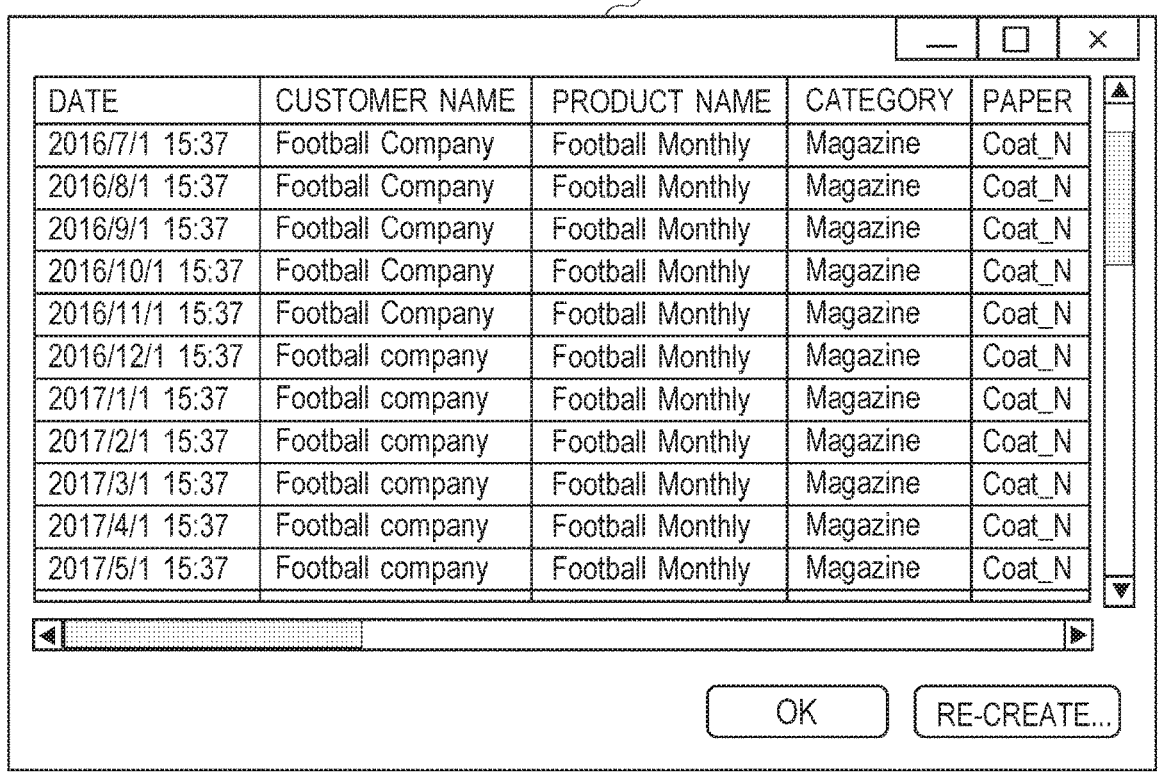
FIG. 11 is a diagram illustrating an example of a screen indicating a second data set displayed by the information input apparatus according to one embodiment of the present invention.

After creating the second data set in Step S214, built-in controller 21 (second analyzer 21c), as needed, causes display unit 27 to display the result of the creation of the second data set (for example, causes display unit 27 to display a screen showing the list of the contents of the second data set as illustrated in FIG. 11) and prompts an operator to judge the appropriateness of the second data set (Step S215). In response to receiving an operator's operation indicating that the second data set is judged as being inappropriate, through operation unit 28 (No in Step S215), built-in controller 21 returns to Step S201 to change the method of trimming the first data set.

As described above, information input apparatus 20 in setup-information input system 10 is configured to perform the following operations. That is, information input apparatus 20 selects a method of trimming the first data set, such as a data-trimming rule in terms of time, on the assumption that the design of the print product has been changed from a certain time point in the past or the assumption that the design of the print product has been changed on a certain month every year in the past, and then creates a second data set by trimming the first data set by using the data-trimming rule in terms of time. The information input apparatus 20 then determines, by using the second data set, at least one second candidate value to be indicated in the at least one of the other input fields (input fields for which at least one candidate value has been calculated on the basis of the first data set), respectively, and creates a rule that associates one or more setting values specified by the operator with the at least one second candidate value. These operations allow the information input apparatus 20 to indicate a candidate value in the corresponding input field in a setup screen displayed on display unit 27 with improved accuracy. Further, when information input apparatus 20 performs the above-described operations (in other words, creates an optimal rule that associates one or more setting value specified by an operator with at least one candidate value to be indicated together with the one or more setting value specified by an operator, by using, for example, machine learning) each time when the data of the database is updated (data is added to the database), information input apparatus 20 can indicate a candidate value in the corresponding input field in a setup screen displayed on display unit 27 with more improved accuracy.

It should be noted that the present invention should not be limited to the above-described embodiments, and the constitution and control operations of the setup-information input system can be modified suitably, unless the modification deviates from the intention of the present invention.

For example, the above-described embodiments gave the operations to, in response to receiving operator's operations to specify one or more setting values for respective one or more input fields in a setup screen displayed on the display, determine at least one candidate value to be indicated in respective at least one input field together with the one or more setting value specified by an operator in the setup screen displayed on the display unit 27. Alternatively, information input apparatus 20 may perform operations to, in response to receiving an operator's operation to select a candidate value indicated in an input field in the setup screen displayed on the display unit 27, through operation unit 28, handle the candidate value as a setting value specified by the operator. That is, information input apparatus 20 may create the first data set by using the selected candidate value together with the one or more setting values specified by the operator, and may determine the at least one candidate value, and create a rule for the at least one candidate value in a similar manner.

Though the above-described embodiments gave operations to be performed when an operator specifies print setup information, the described operations can be applied similarly to other operations to be performed when an operator specifies arbitrary setup information for multiple options for a job in a setup screen.

The present invention is applicable to input assisting methods, input assistance programs, non-transitory computer-readable recording media each storing the input assistance program, and setup-information input systems, which can assist operator's operations to input setup information into input fields in a setup screen.

Although embodiments of the present invention have been described and illustrated in detail, it is clearly understood that the same is by way of illustration and example only and not limitation, the scope of the present invention should be interpreted by terms of the appended claims.

The invention claimed is:

1. An input assisting method for use in a system including a storage device and an information input apparatus including an input device, a hardware processor which is communicatively connected to the storage device, and a display that displays a setup screen indicating a candidate value in a corresponding input field in response to receiving an operator's operation on the setup screen through the input device, the candidate value being determined by using a rule created by using machine learning, on a basis of one or more setting values each specified in another input field in the setup screen by the operator through the input device, the method comprising:
  accumulating sets of setting values that had been specified for jobs used for print processing, associated with time and date information, in a database stored in the storage device;
  performing a rule creation by the hardware processor, including
    receiving an operator's operation through the input device to specify one or more setting values for respective one or more input fields in a setup screen displayed on the display,
    creating a first data set by extracting from the database sets of setting values, each including the one or more setting values specified by the operator, determining, by using the first data set, at least one candidate value to be indicated in at least one of the other input fields in the setup screen, respectively, and creating a rule that associates the one or more setting values specified by the operator with the at least one candidate value;

calculating, by the hardware processor, an evaluation value indicating a degree of association between the one or more setting values specified by the operator with the at least one candidate value, to judge whether the evaluation value is not less than a predetermined criterion;

on finding no candidate value for which the evaluation value being not less than the predetermined criterion was calculated, performing a rule re-creation by the hardware processor, including, creating a second data set by trimming the first data set by using a data-trimming rule in terms of time, determining, by using the second data set, at least one second candidate value to be indicated in the at least one of the other input fields, respectively, and creating a rule that associates the one or more setting values specified by the operator with the at least one second candidate value; and in response to detecting an operator's input operation on a certain input field among the at least one of the other input fields in the setup screen, causing, by the hardware processor, the display to indicate a candidate value determined according to the rule, in the certain input field.

2. The method of claim 1,
wherein the performing a rule creation includes,
in response to receiving an operator's operation through the input device to select a candidate value indicated in an input field in the setup screen displayed on the display, handling the candidate value as a setting value specified by the operator, to create the first data set by using the candidate value together with the one or more setting values specified by the operator.

3. The method of claim 1,
wherein the creating a second data set includes,
defining a period to be used for trimming the first data set, for the data-trimming rule,
trimming the first data set by extracting from the first data set sets of setting values associated with the latest time and date information for the period, to create the second data set,
determining, by using the second data set, the at least one second candidate value, and
calculating a second evaluation value indicating a degree of association between the one or more setting values specified by the operator with the at least one second candidate value, to judge whether the second evaluation value is not less than the predetermined criterion, and
on finding no second candidate value for which the second evaluation value being not less than the predetermined criterion was calculated, changing the data-trimming rule and re-creating the second data set according to the data-trimming rule changed.

4. The method of claim 3,
wherein the creating a second data set includes,
on finding a second candidate value for which the second evaluation value being not less than the predetermined criterion was calculated, calculating the second evaluation value for the second candidate value repeatedly while increasing the period and re-creating the second data set by using the period,
checking a change of the second evaluation value with an increase of the period, and
on finding a decrease of the second evaluation value in the checking, trimming the first data set by extracting the sets of setting values from the first data set by using the period immediately before the decrease, to fix the second data set.

5. The method of claim 4,
wherein the creating a second data set includes,
on finding an increase of the second evaluation value in the checking, defining an interval to be used for extracting sets of setting values from the first data set periodically, for the data-trimming rule, and
trimming the first data set by extracting the sets of setting values from the first data set at the intervals, to fix the second data set.

6. The method of claim 1,
wherein the creating a second data set includes,
on finding in the first data set information indicating an interval to be used for extracting sets of setting values from the first data set periodically, using the interval extracted from the first data set to trim the first data set by extracting the sets of setting values at the intervals, to create the second data set.

7. The method of claim 1,
wherein the performing a rule re-creation includes,
after creating the second data set, causing, by the hardware processor, the display to display the second data set, and prompting an operator to judge an appropriateness of the second data set, and
on receiving an operator's operation indicating that the second data set is judged as being inappropriate, through the input device, changing the data-trimming rule and re-creating the second data set.

8. The method of claim 1,
wherein the evaluation value is one of support, confidence and lift used in association analysis.

9. A non-transitory computer-readable recording medium storing an input assistance program for use in a system including a storage device and an information input apparatus,
the storage device storing a database including sets of setting values that had been specified for jobs used for print processing, associated with time and date information, and
the information input apparatus including an input device, a hardware processor which is communicatively connected to the storage device, and a display that displays a setup screen indicating a candidate value in a corresponding input field in response to receiving an operator's operation on the setup screen through the input device, the candidate value being determined by using a rule created by using machine learning, on a basis of one or more setting values each specified in another input field in the setup screen by the operator through the input device,
the program comprising instructions which, when executed by the hardware processor of the information input apparatus, cause the hardware processor to perform operations comprising:
performing a rule creation including
receiving an operator's operation through the input device to specify one or more setting values for respective one or more input fields in a setup screen displayed on the display, creating a first data set by extracting from the database sets of setting values, each including the one or more setting values specified by the operator, determining, by using the first data set, at least one candidate value to be indicated in at least one of the other input fields in the setup screen, respectively, and creating a rule that associates the one or more setting values specified by the operator with the at least one candidate value;

calculating an evaluation value indicating a degree of association between the one or more setting values specified by the operator with the at least one candidate value, to judge whether the evaluation value is not less than a predetermined criterion;

on finding no candidate value for which the evaluation value being not less than the predetermined criterion was calculated, performing a rule re-creation including, creating a second data set by trimming the first data set by using a data-trimming rule in terms of time, determining, by using the second data set, at least one second candidate value to be indicated in the at least one of the other input fields, respectively, and creating a rule that associates the one or more setting values specified by the operator with the at least one second candidate value; and in response to detecting an operator's input operation on a certain input field among the at least one of the other input fields in the setup screen, causing the display to indicate a candidate value determined according to the rule, in the certain input field.

10. The non-transitory computer-readable recording medium of claim 9, wherein the performing a rule creation includes, in response to receiving an operator's operation through the input device to select a candidate value indicated in an input field in the setup screen displayed on the display, handling the candidate value as a setting value specified by the operator, to create the first data set by using the candidate value together with the one or more setting values specified by the operator.

11. The non-transitory computer-readable recording medium of claim 9, wherein the creating a second data set includes, defining a period to be used for trimming the first data set, for the data-trimming rule, trimming the first data set by extracting from the first data set sets of setting values associated with the latest time and date information for the period, to create the second data set, determining, by using the second data set, the at least one second candidate value, and calculating a second evaluation value indicating a degree of association between the one or more setting values specified by the operator with the at least one second candidate value, to judge whether the second evaluation value is not less than the predetermined criterion, and on finding no second candidate value for which the second evaluation value being not less than the predetermined criterion was calculated, changing the data-trimming rule and re-creating the second data set according to the data-trimming rule changed.

12. The non-transitory computer-readable recording medium of claim 11, wherein the creating a second data set includes, on finding a second candidate value for which the second evaluation value being not less than the predetermined criterion was calculated, calculating the second evaluation value for the second candidate value repeatedly while increasing the period and re-creating the second data set by using the period, checking a change of the second evaluation value with an increase of the period, and on finding a decrease of the second evaluation value in the checking, trimming the first data set by extracting the sets of setting values from the first data set by using the period immediately before the decrease, to fix the second data set.

13. The non-transitory computer-readable recording medium of claim 12, wherein the creating a second data set includes, on finding an increase of the second evaluation value in the checking, defining an interval to be used for extracting sets of setting values from the first data set periodically, for the data-trimming rule, and trimming the first data set by extracting the sets of setting values from the first data set at the intervals, to fix the second data set.

14. The non-transitory computer-readable recording medium of claim 9, wherein the creating a second data set includes, on finding in the first data set information indicating an interval to be used for extracting sets of setting values from the first data set periodically, using the interval extracted from the first data set to trim the first data set by extracting the sets of setting values at the intervals, to create the second data set.

15. The non-transitory computer-readable recording medium of claim 9, wherein the performing a rule re-creation includes, after creating the second data set, causing, by the hardware processor, the display to display the second data set, and prompting an operator to judge an appropriateness of the second data set, and on receiving an operator's operation indicating that the second data set is judged as being inappropriate, through the input device, changing the data-trimming rule and re-creating the second data set.

16. The non-transitory computer-readable recording medium of claim 9, wherein the evaluation value is one of support, confidence and lift used in association analysis.

17. A setup-information input system comprising:

a storage device storing a database including sets of setting values that had been specified for jobs used for print processing, associated with time and date information; and an information input apparatus including an input device, a hardware processor which is communicatively connected to the storage device, and a display that displays a setup screen indicating a candidate value in a corresponding input field in response to receiving an operator's operation on the setup screen through the input device, the candidate value being determined by using a rule created by using machine learning, on a basis of one or more setting values each specified in another input field in the setup screen by the operator through the input device, wherein the hardware processor performs operations including:

performing a rule creation including receiving an operator's operation through the input device to specify one or more setting values for respective one or more input fields in a setup screen displayed on the display, creating a first data set by extracting from the database sets of setting values, each including the one or more setting values specified by the operator, determining, by using the first data set, at least one candidate value to be indicated in at least one of the other input fields in the setup screen, respectively, and creating a rule that associates the one or more setting values specified by the operator with the at least one candidate value;

calculating an evaluation value indicating a degree of association between the one or more setting values specified by the operator with the at least one candidate value, to judge whether the evaluation value is not less than a predetermined criterion;

on finding no candidate value for which the evaluation value being not less than the predetermined criterion was calculated, performing a rule re-creation including, creating a second data set by trimming the first data set by using a data-trimming rule in terms of time, determining, by using the second data set, at least one second candidate value to be indicated in the at least one of the other input fields, respectively, and creating a rule that associates the one or more setting values specified by the operator with the at least one second candidate value; and in response to detecting an operator's input operation on a certain input field among the at least one of the other input fields in the setup screen, causing the display to indicate a candidate value determined according to the rule, in the certain input field.

18. The setup-information input system of claim 17, wherein the performing a rule creation includes, in response to receiving an operator's operation through the input device to select a candidate value indicated in an input field in the setup screen displayed on the display, handling the candidate value as a setting value specified by the operator, to create the first data set by using the candidate value together with the one or more setting values specified by the operator.

19. The setup-information input system of claim 17, wherein the creating a second data set includes, defining a period to be used for trimming the first data set, for the data-trimming rule, trimming the first data set by extracting from the first data set sets of setting values associated with the latest time and date information for the period, to create the second data set, determining, by using the second data set, the at least one second candidate value, and calculating a second evaluation value indicating a degree of association between the one or more setting values specified by the operator with the at least one second candidate value, to judge whether the second evaluation value is not less than the predetermined criterion, and on finding no second candidate value for which the second evaluation value being not less than the predetermined criterion was calculated, changing the data-trimming rule and re-creating the second data set according to the data-trimming rule changed.

20. The setup-information input system of claim 19, wherein the creating a second data set includes, on finding a second candidate value for which the second evaluation value being not less than the predetermined criterion was calculated, calculating the second evaluation value for the second candidate value repeatedly while increasing the period and re-creating the second data set by using the period, checking a change of the second evaluation value with an increase of the period, and on finding a decrease of the second evaluation value in the checking, trimming the first data set by extracting the sets of setting values from the first data set by using the period immediately before the decrease, to fix the second data set.

21. The setup-information input system of claim 20, wherein the creating a second data set includes, on finding an increase of the second evaluation value in the checking, defining an interval to be used for extracting sets of setting values from the first data set periodically, for the data-trimming rule, and trimming the first data set by extracting the sets of setting values from the first data set at the intervals, to fix the second data set.

22. The setup-information input system of claim 17, wherein the creating a second data set includes, on finding in the first data set information indicating the interval to be used for extracting sets of setting values from the first data set periodically, using the interval extracted from the first data set to trim the first data set by extracting the sets of setting values at the intervals, to create the second data set.

23. The setup-information input system of claim 17, wherein the performing a rule re-creation includes, after creating the second data set, causing, by the hardware processor, the display to display the second data set, and prompting an operator to judge an appropriateness of the second data set, and on receiving an operator's operation indicating that the second data set is judged as being inappropriate, through the input device, changing the data-trimming rule and re-creating the second data set.

24. The setup-information input system of claim 17, wherein the evaluation value is one of support, confidence and lift used in association analysis.

* * * * *